(12) United States Patent
Herrington et al.

(10) Patent No.: US 10,471,761 B2
(45) Date of Patent: *Nov. 12, 2019

(54) TRANSACTION CARD HAVING FEATURES FOR EASY REMOVAL FROM WALLET

(71) Applicant: Capital One Services, LLC, McLean, VA (US)

(72) Inventors: Daniel Herrington, McLean, VA (US); Scott McClellan, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/426,716

(22) Filed: May 30, 2019

(65) Prior Publication Data

US 2019/0283484 A1 Sep. 19, 2019

Related U.S. Application Data

(63) Continuation of application No. 15/926,456, filed on Mar. 20, 2018, which is a continuation of application No. 15/921,886, filed on Mar. 15, 2018, now Pat. No. 10,083,383.

(51) Int. Cl.
| | |
|---|---|
| *G06K 19/02* | (2006.01) |
| *B42D 25/44* | (2014.01) |
| *B42D 25/475* | (2014.01) |
| *G06K 19/077* | (2006.01) |
| *B42D 25/465* | (2014.01) |

(52) U.S. Cl.
CPC ........... *B42D 25/44* (2014.10); *B42D 25/465* (2014.10); *B42D 25/475* (2014.10); *G06K 19/07722* (2013.01); *G06K 19/07747* (2013.01)

(58) Field of Classification Search
CPC .... B42D 25/44; B42D 25/465; B42D 25/475; G06K 19/07722; G06K 19/07747
USPC ......................................... 235/488, 379, 487
See application file for complete search history.

(56) References Cited

U.S. PATENT DOCUMENTS

| | | | |
|---|---|---|---|
| 4,443,027 A | 4/1984 | McNeely et al. | |
| 5,096,228 A | 3/1992 | Rinderknecht | |
| 5,700,037 A | 12/1997 | Keller | |
| 6,471,127 B2 | 10/2002 | Pentz et al. | |
| 7,273,234 B1 | 9/2007 | Collins et al. | |
| 7,341,198 B2 | 3/2008 | Nishizawa et al. | |
| 9,471,825 B2 | 10/2016 | Lowe | |
| 9,750,330 B2 | 9/2017 | Baker | |
| 10,083,383 B1 * | 9/2018 | Herrington | G06K 19/041 |
| 2010/0127225 A1 | 5/2010 | Mika-Duesler | |
| 2013/0170938 A1 | 7/2013 | Lowden | |

* cited by examiner

*Primary Examiner* — Karl D Frech
(74) *Attorney, Agent, or Firm* — Finnegan, Henderson, Farabow, Garrett & Dunner LLP

(57) ABSTRACT

A transaction card includes a first full thickness portion and a second, reduced thickness portion. Each of the first and second portions includes a top surface and an opposing bottom surface spaced from the top surface by a thickness of the card. The first, full thickness portion includes an extent of the card that remains exposed when the card is inserted into a pocket of a card-carrying case, and a feature deviating from a flat region along at least one of the top surface and the opposing bottom surface of the card. The feature is configured for tactile engagement to facilitate removal of the card from the pocket.

17 Claims, 3 Drawing Sheets

TRANSACTION CARD HAVING FEATURES FOR EASY REMOVAL FROM WALLET

CROSS-REFERENCE TO RELATED APPLICATIONS

This application is a continuation of U.S. patent application Ser. No. 15/926,456, filed Mar. 20, 2018, which was a continuation of U.S. patent application Ser. No. 15/921,886, filed Mar. 15, 2018, now U.S. Pat. No. 10,083,383, issued Sep. 25, 2018, the entire contents of all of which are expressly incorporated herein by reference in their entireties.

TECHNICAL FIELD

The disclosed embodiments generally relate to a transaction card, and more particularly, to a transaction card having features that facilitate easy removal from and insertion into a pocket in a card-carrying case.

BACKGROUND

Transaction cards, such as credit and debit cards, have increasingly become a primary means for customers to complete financial transactions. Typically, transaction cards are formed out of a plastic material as a single piece. For example, a typical credit card may be manufactured out of plastic such as polycarbonate (PC) or polyvinyl chloride (PVC) using an injection molding process. The plastic card may then be modified to add functional and/or visual features. For example, a magnetic strip or electronic device (e.g., a microchip) may be affixed to one side, the card may be stamped with the card number and customer name, and color or a design may be added for appearance.

Transaction cards are typically placed in a pocket, sleeve, or slot of a wallet, carrying case, or other type of card-carrying apparatus. To perform their function properly, card wallets and carrying cases are frequently equipped with multiple pockets, sleeves, or slots in close proximity to each other for holding one or more cards in an arrangement selected by the user. In order to hold cards snugly, these features are often designed to provide very little space for the card. Moreover, with a limited number of separate card-receiving receptacles in their wallet or carrying case, many people find it necessary to store two, three or more cards in a single pocket, sleeve, or slot (all forms of card-receiving features are referred to herein as "pockets").

The result is that the cards are often held tightly within each pocket, and several factors may contribute to making it difficult to remove or replace a particular desired card from or into a pocket. For example, if a consumer needs to remove a card sandwiched between two other cards in a single pocket, or insert a card into a pocket when other adjacent pockets already contain cards, there may be difficulty in gripping an individual card or sliding a card into a pocket. In addition, the surface of many cards, such as credit cards and ATM cards, is smooth, making it difficult to grip. Consumers with large fingers, or elderly consumers or others with reduced dexterity, may thus encounter special difficulties in extricating a particular card from a wallet or carrying case, or reinserting the card back into the pocket of the carrying. Difficulty in removing a single selected card increases the time necessary for the transaction, causes stored cards to be frequently reshuffled and potentially disorganized, and increases the likelihood that cards will be dropped or lost. Similarly, difficulty in inserting a card into a pocket increases the time involved in performing a transaction and increases the likelihood that cards will be dropped or lost.

Vendors also have an interest in the ease of card removal. For a vendor, an important object of a transaction is to receive the correct card from the consumer, collect the necessary information—for example by reading the encoded information on the card's magnetic stripe—and return the card promptly. A consumer's difficulty in removing a card from a wallet or carrying case or replacing cards back into the pockets of a card-carrying case may increase transaction time, which may lead in turn to longer lines and increased waiting time for other consumers, or the need for additional personnel to serve customers in a prompt manner.

The present disclosure is directed to overcoming one or more of the problems set forth above and/or other problems associated with conventional transaction card constructions.

SUMMARY

The disclosed embodiments relate to a credit card having features that facilitate removal and replacement of a transaction card from and to a pocket in a card-carrying case. In one aspect, the present disclosure is directed to a transaction card. The transaction card includes a first, full thickness portion, and a second, reduced thickness portion. Each of the first and second portions includes a top surface and an opposing bottom surface spaced from the top surface by a thickness of the card. The first, full thickness portion includes an extent of the card that remains exposed when the card is inserted into a pocket of a card-carrying case. The first, full thickness portion also includes a feature deviating from a smooth, flat region along at least one of the top surface and the opposing bottom surface of the card, and configured for tactile engagement to facilitate removal of the card from the pocket.

In another aspect, the present disclosure is directed to a bank card. The bank card includes a first extent configured to remain substantially outside of a pocket of a card-carrying case when the card is inserted into the pocket. The first extent includes a gripping feature configured for tactile engagement to facilitate removal of the card from the pocket. The bank card also includes a second extent contiguous with the first extent and configured to be inserted into the pocket. The second extent includes a portion of the card that is thinner than remaining portions of the card to facilitate insertion of the card into the pocket.

In another aspect, the present disclosure is directed to a financial transaction card. The financial transaction card includes a first portion and a second portion contiguous with the first portion. The card also includes a first side of the first and second portions, and a second, opposing side of the first and second portions. The second, opposing side is spaced from the first side by a thickness of the card. The first portion is configured to remain outside of a pocket of a card-carrying case when the card is inserted into a full depth of the pocket, and includes a gripping feature configured for tactile engagement to facilitate removal of the card from the pocket. The second portion includes an extent of the card that is thinner than remaining portions of the card to facilitate insertion of the card into the pocket. A clear laminate layer extends over at least one of the first and second sides of the first and second portions. A transaction component is affixed along at least one of the first and second sides.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
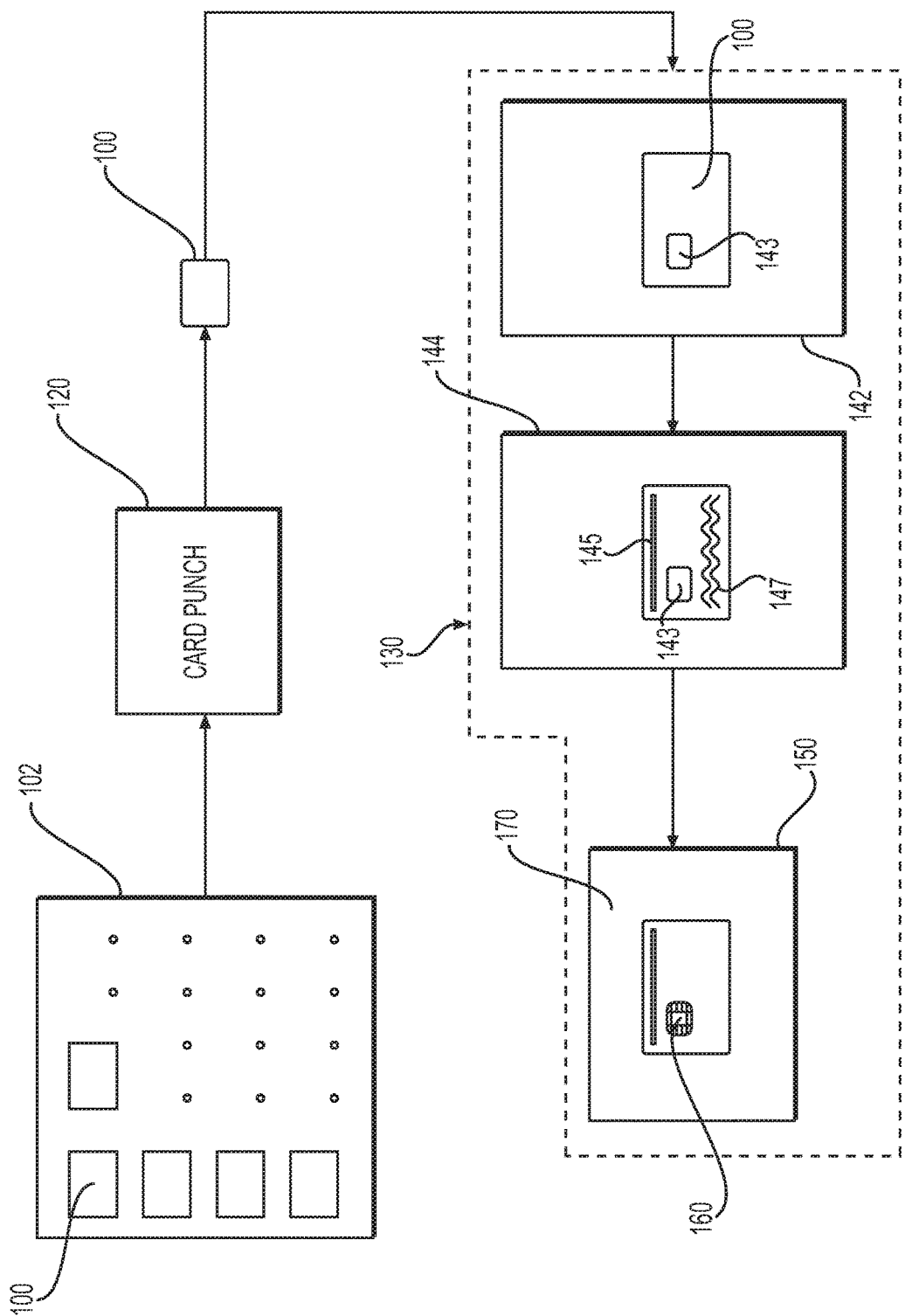
FIG. 1 is a block diagram of an example of a system for producing transaction cards according to embodiments of this disclosure.

Reference will now be made in detail to the disclosed embodiments, examples of which are illustrated in the accompanying drawings. Wherever convenient, the same reference numbers will be used throughout the drawings to refer to the same or like parts.

Disclosed embodiments include a transaction card having structural improvements for facilitating removal and insertion of the transaction card from and into a pocket in a card-carrying case, and methods of manufacturing a transaction card. For example, disclosed embodiments include a card having a feature to improve grippability of the card when the card is positioned in a pocket of a card-carrying case, and a feature to facilitate insertion of the card into the pocket. The feature to improve grippability may include a deviation from a flat surface on a region of the card that remains exposed when the card is inserted into a full depth of the pocket. The feature to facilitate insertion of the card into the pocket may include a portion of the card that is thinner than remaining portions of the card.

Various methods may be used to manufacture a transaction card having the structural improvements that facilitate insertion of the card into a pocket of a card-carrying case and removal of the card from the pocket. The structural improvements may be included in one or more components making up the card. The relative physical arrangement of the structural improvements and known transaction components such as a microchip or a magnetic strip installed on the card may be configured to be suitable for satisfying certain standards, criteria or preferences. The construction of the card may allow for ease of manufacture, customization and interchangeability, compatibility with known card readers and industry standards, and ease of use of the card.

The term "transaction card," as used herein, may refer to any physical card product that is configured to provide information, such as financial information (e.g., card numbers, account numbers, etc.), quasi-financial information (e.g., rewards balance, discount information, etc.) and/or individual-identifying information (e.g., name, address, etc.), to another device. Examples of transaction cards include credit cards, debit cards, gift cards, rewards cards, frequent flyer cards, merchant-specific cards, discount cards, identification cards, and driver's licenses, but are not limited thereto.

A financial transaction card may be used in accessing services and benefits provided by a financial services provider system. A services provider system may comprise one or more computer systems associated with an entity that provides financial services. For example, the entity may be a bank, credit union, credit card issuer, or other type of financial service entity that generates, provides, manages, and/or maintains financial service accounts for one or more customers. Financial service accounts may include, for example, credit card accounts, checking accounts, savings accounts, loan accounts, reward accounts, and any other types of financial service account known to those skilled in the art. Financial service accounts may be associated with physical financial service transaction cards, such as a credit or debit cards that a user may carry on their person and use to perform financial service transactions, such as purchasing goods and/or services at a point of sale (POS) terminal. Financial service accounts may also be associated with electronic financial products and services, such as a digital wallet or similar account that may be used to perform electronic transactions, such as purchasing goods and/or services online. In some embodiments, a financial service provider system may be associated with an organization other than a financial institution, including a gift or reward card administrator, an airline or frequent flyer administrator, a merchant (which may in some embodiments be associated with a merchant system), a government institution (e.g., an agency), or the like.

A merchant system may be one or more computer systems associated with a merchant. For example, a merchant system may be associated with an entity that provides goods and/or services (e.g., a retail store). The merchant may include brick-and-mortar location(s) that a customer may physically visit and purchase goods and services. Such physical locations may include computing devices that perform financial service transactions with customers (e.g., POS terminal(s), kiosks, etc.). Additionally or alternatively, a merchant system may be associated with a merchant who provides electronic shopping mechanisms, such as a website or a similar online location that consumers may access using a computer through browser software, a mobile application, or similar software. A merchant system may include a client device, such as a laptop computer, desktop computer, smart phone, or tablet, that a customer may operate to accesses the electronic shopping mechanism.

A network may be any type of network that facilitates communications and data transfer between components of transaction systems, such as between a financial service provider system and a merchant system. A network may be a Local Area Network (LAN), a Wide Area Network (WAN), such as the Internet, and may be a single network or a combination of networks. A network is not limited to the above examples and a transaction system may implement any type of network that allows various entities of the transaction system to exchange data and information.

A transaction system may be configured to conduct a transaction associated with the use of a transaction card 100. In one example, a financial service provider system may provide a transaction card 100 to a customer for use in conducting transactions associated with a financial service account held by the customer. In an example of one such transaction, the customer may use transaction card 100 at a merchant location to make a purchase. During the course of the purchase, information may be transferred from transaction card 100 to a merchant system (e.g., a point of sale device). The merchant system may communicate with the financial service provider system via the network to complete the transaction. For example, the merchant system may receive account information from transaction card 100 by scanning a magnetic strip on transaction card 100, receiving wireless data emitted by transaction card 100, or receiving data transmitted by a microchip embedded in transaction card 100. The merchant system may transmit the account information and a purchase amount, among other transaction information, to a financial service provider system. The financial service provider system may settle the transaction by transferring funds from the customer's financial service account to a financial service account associated with the merchant.

Transaction card 100 is not limited to financial products and may be any physical card product that is configured to provide information to another device. For example, transaction card 100 may be an identification card configured to provide information to a device in order to identify the holder of the card (e.g., driver's license) or provide information about the holder of the card (e.g., insurance card).

As shown in FIG. 1, transaction card 100 may be cut or stamped from a larger card board 102 containing blanks for a plurality of transaction cards 100. Card board 102 may be formed by printing common information for a plurality of individual transaction cards on a printing sheet made from a plastic material such as polyvinyl chloride (PVC). polycarbonate, polyolefin (polypropylene or the like), poly ethylene terephathalate (PET) or the like. The common information may be printed on card board 102 using offset printing techniques, or laser printing techniques, for example, and may include information common to a plurality of individual transaction cards. The common information may include a company name for a company issuing the card, an indication of a particular type of card, common characters, patterns, or diagrams, etc.

A card punch 120 used for cutting individual transaction cards 100 from card board 102 may include cutting edges and surfaces configured to stamp out individual transaction cards 100, with each card 100 having length and width dimensions that comply with various industry standards (such as ISO standards), criteria, or preferences. Each transaction card 100 may be subjected to a series of manufacturing processes 130 to incorporate desired structural features and components into each card 100. In one exemplary implementation of manufacturing processes 130, an initial processing step 142 for transaction card 100 after being stamped from card board 102 may include milling out a recess 143 in one side of card 100 using, for example, a computer numerically controlled (CNC) end mill. Recess 143 may be positioned and configured for receipt of a transaction component 160.

In some embodiments, transaction component 160 may include one or more transaction components, such as electronic devices, magnetic devices, electromagnetic devices, and/or other elements configured to receive, store, process, provide, transfer, transmit, conduct, send, delete, and/or generate information. For example, transaction component 160 may be a microchip (e.g., EMV chip), a communication device (e.g., NFC antenna, Bluetooth® device, WiFi device), a magnetic strip, a barcode, QR code, etc. Transaction component 160 may be secured to card 100 in such a way that allows card 100 to carry transaction component 160 while maintaining a utility of transaction component 160 (i.e., allowing transaction component 160 to interact with a merchant system).

As further shown in FIG. 1, manufacturing processes 130 may further include additional machining operations 144 implemented using the same CNC end mill employed during the milling operations performed at initial processing step 142. Additional machining operations 144 may include milling a slot 145 part way or all of the way through the thickness of card 100 and in a direction substantially parallel to one edge of card 100. The phrase "substantially parallel", as used herein refers to parallel within standard machining and industry tolerances during the production of a transaction card according to industry standards such as ISO/IEC (International Organization for Standardization and International Electrotechnical Commission) standards. ISO/IEC 7813 is an example of an international standard that defines properties of financial transaction cards such as ATM (automated teller machine) or credit cards.

Slot 145 may provide a feature deviating from a flat surface of card 100 and providing a grippable feature for enhancing tactile engagement with card 100 to facilitate removal of card 100 from a pocket of a card-carrying case. A feature deviating from a flat surface of card 100 may include additional or alternative features such as protruding or recessed dimples, roughened portions along the flat surface on at least one side of card 100, striations along a surface on at least one side of card 100, and any other feature that improves tactile engagement with card 100 as opposed to a completely smooth, flat surface. In an exemplary implementation, such as shown in FIG. 1, slot 145 may be positioned in close proximity to an edge of card 100 that will remain exposed when card 100 is fully inserted into a pocket of a card-carrying case, such that a card user may insert a fingernail or otherwise press an end portion of a finger against slot 145 when card 100 is in the pocket.

Slot 145 may be machined into card 100 in a first region such that the distance from an edge of card 100 typically left exposed when card 100 is fully inserted into a pocket of a card-carrying case may be a function of the thickness of card 100 and a strength of the material used in producing the card, as well as standard manufacturing tolerances. In embodiments of card 100 where a transaction component such as a magnetic strip is included along one surface of the card, the position of slot 145 may also be selected such that there is no interference with the magnetic strip or with the reading function performed by a standard electronic card reader such as a POS terminal where card 100 is used. Slot 145 may be machined along a longer side of card 100, or in alternative implementations, along a shorter side of card 100. Slot 145 is also machined such that a sufficient space is left between slot 145 and recess 143 for transaction component 160 so as to not create any anomalies along an outer periphery of recess 143 or between recess 143 and slot 145 that may interfere with the structural integrity of card 100 or with the placement and retention of a transaction component such as a microchip in recess 143.

As also shown in FIG. 1, additional machining operations 144 may include machining a reduction in thickness of card 100 along a second region 147 forming the portion of card 100 that will be inserted into the pocket of a card-carrying case. Second region 147 may be referred to in this application as a reduced thickness portion of card 100. Reduced thickness portion 147 of card 100 includes an extent of card 100 having a thickness that is less than a full thickness portion of card 100, such as the portion of card 100 including slot 145 and transaction component 160. The full thickness portion of card 100 may comply with standard card thicknesses in order to ensure the proper structural integrity of card 100 in the extent of the card that includes transaction component 160 and features for improved tactile engagement. Additionally, the full thickness portion of card 100 may comply with standard card thicknesses, dimensions between top and bottom surfaces and between end surfaces of card 100 to ensure interoperability with standard card readers.

Card 100 includes a first surface and an opposing second surface spaced from the first surface by the thickness of card 100 (alternatively referred to herein as "top" and/or "bottom" surfaces). The thickness of card 100 may be tapered or reduced in second region 147 (reduced thickness portion) from a greater thickness adjacent the first region including slot 145 to a smallest thickness of card 100 at an edge typically inserted first into the pocket of a card-carrying case. After the additional machining operations 144 to add structural improvements for facilitating insertion and removal of card 100 from the pocket of a card-carrying case, card 100 may be further processed at step 150 to apply a clear, laminated layer 170 over all or a portion of the top and bottom surfaces of card 100. Laminated layer 170 may extend along the entirety of the outer peripheral surfaces of card 100, including along surfaces within slot 145.

As best seen in FIGS. 2A, 2B, 3A, and 3B, card 100 includes a first end surface 107, a top surface 106, a second end surface 109, and a bottom surface 108. References to "first", "second", "top", and "bottom" throughout this application are illustrative only with reference to the figures, and are not meant to limit possible orientations of the card and its features. In an exemplary embodiment according to this disclosure, first end surface 107 may be the surface along the end of card 100 that remains outside of the pocket of the card-carrying case when the card is inserted into the pocket. Second end surface 109 may be the surface along the leading edge of card 100 as card 100 is inserted into the pocket. Top surface 106 may be along the side of card 100 typically including printed and/or embossed information such as a name of a financial institution that issued the card, the type of card, and the name of an account holder. A transaction component such as microchip 160 may be affixed in recess 143 formed along top surface 106 of card 100. Bottom surface 108 may include another transaction component such as a magnetic strip containing information on the account, and a signature block for an account holder.

At least one of top surface 106 and bottom surface 108 may include a first region containing slot 145 or other alternative tactile features to facilitate gripping of card 100 when card 100 is contained within a pocket of a card-carrying case. In one embodiment, slot 145 may extend all the way through the entire thickness of card 100 such that it provides improved grippability of card 100 regardless of which way the card is inserted and removed from the pocket. Alternatively, a separate slot 145 may be provided along both top and bottom surfaces of card 100 such that each slot 145 extends only part way through a thickness of card 100. In an embodiment with a separate slot or other tactile feature such as raised or indented dimples, striations, embossments, roughened portions, or other deviations from a flat, smooth surface on one or both sides of card 100, tactile features on opposite sides of card 100 may be aligned or offset from each other. The tactile features such as slot 145 are positioned in an area, region, or extent of the card that is configured to remain exposed when card 100 is inserted into a pocket of a card-carrying case. The tactile features provide improved tactile engagement for removal of card 100 from the pocket. For example, slot 145 may provide a recess into which a user may insert a fingernail or press a portion of a fingertip in order to facilitate gripping of card 100 and removal of card 100 from a tight fit within the pocket of a card-carrying case.

Figure 2A:
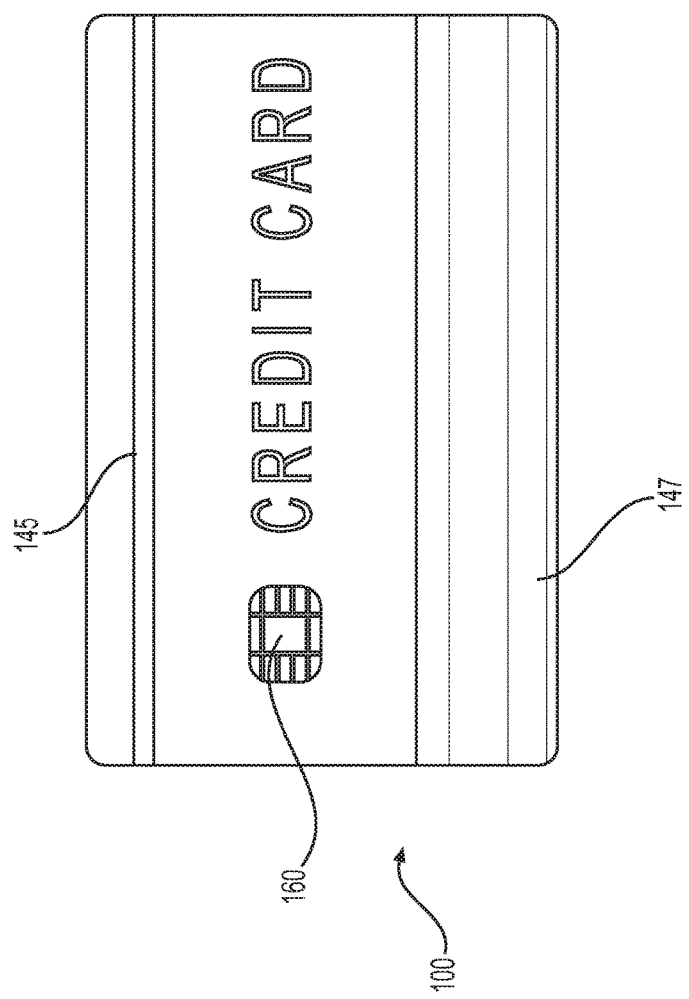
FIG. 2A is a top plan view of an embodiment of a transaction card.
Figure 2B:
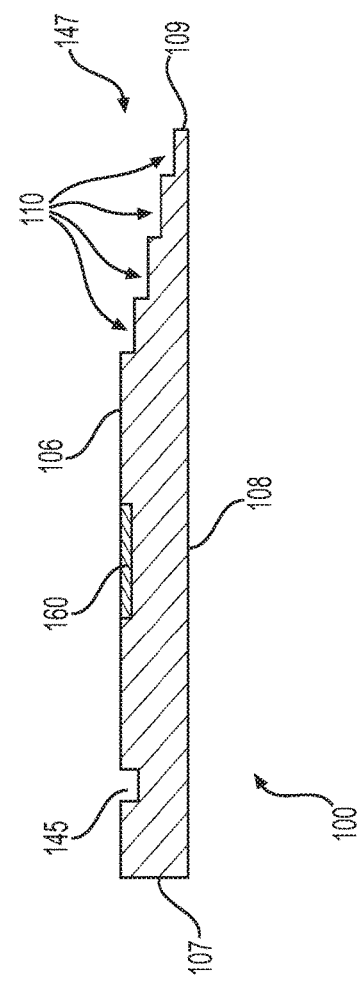
FIG. 2B is a cross-sectional, side elevation view of the transaction card of FIG. 2A.

Second region 147 (or reduced thickness portion) of card 100 is an extent of the card that is configured to be inserted into the pocket of a card-carrying case. In various exemplary embodiments second region 147 may be machined to create a thinner portion of the card that is more easily inserted into the pocket of a card-carrying case than a full thickness portion of card 100. When the machining of second region 147 is performed by the same end mill used to machine recess 143 for a microchip or other transaction component 160, the end mill may make multiple passes along top surface 106 of card 100 to create a stepped profile with steps 110, such as shown in FIGS. 2B and 3B. The result of the machining operation may be to create a substantially outwardly convex profile along second region 147, transitioning from a thickest part of the card closer to first end surface 107 to a thinnest part of the card at second end surface 109. The stepped profile shown in FIGS. 2B and 3B is exaggerated to illustrate the consecutive passes made by an end mill and is not necessarily shown to scale. The portion of card 100 in second region 147 that is thinner than remaining portions of the card may include multiple, successively thinner portions of card 100 at successively decreasing distances from an outer edge of the card along end surface 109 configured to be inserted into the pocket before other portions of the card. Alternative implementations may include laser machining of second region 147, or injection molding of card 100 such that an outwardly convex profile along second region 147 is smooth, providing an even transition in thickness from top surface 106 to end surface 109.

Figure 3A:
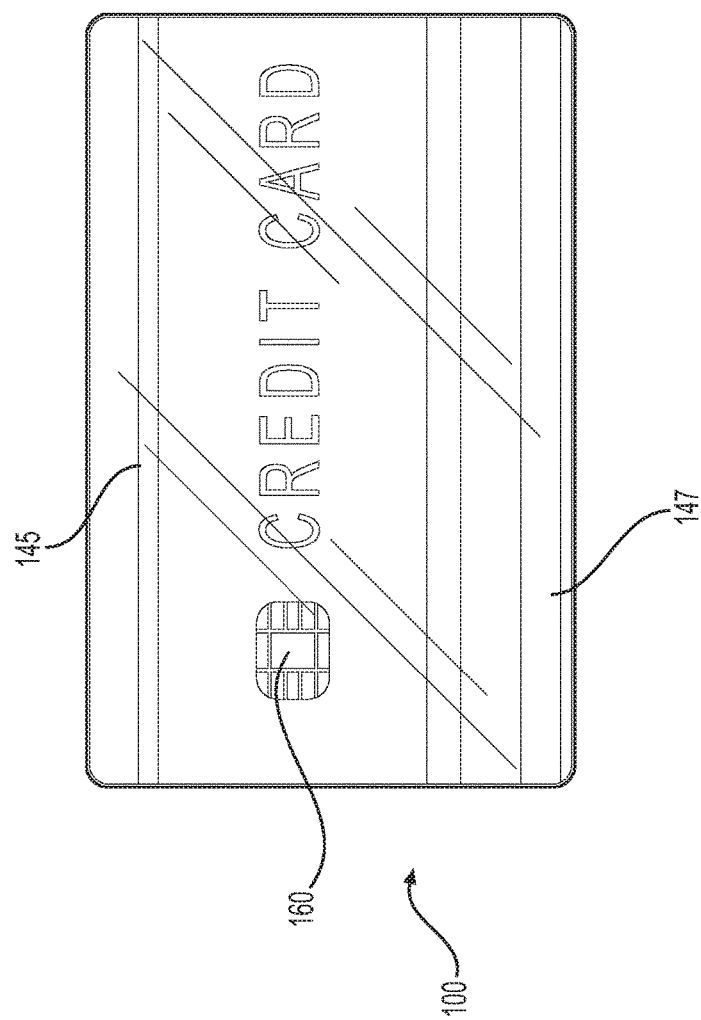
FIG. 3A is a top plan view of the embodiment of a transaction card shown in FIGS. 2A and 2B, with a clear laminate layer applied over the card.
Figure 3B:
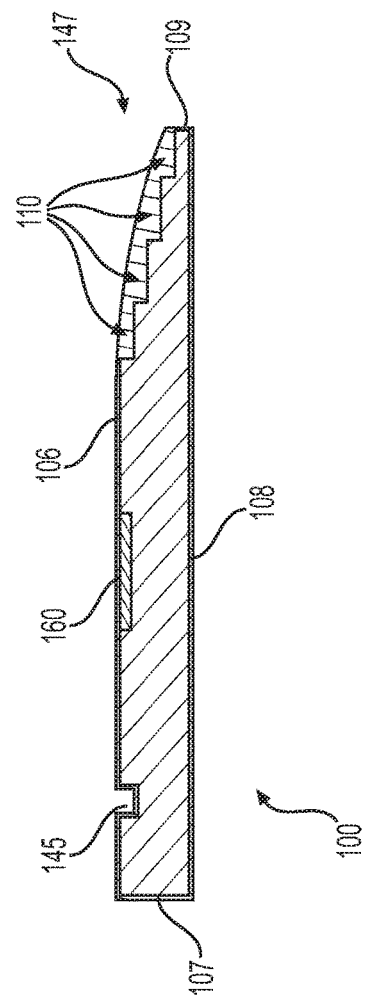
FIG. 3B is a cross-sectional, side elevation view of the transaction card of FIG. 3A.

As shown in FIGS. 3A and 3B, card 100 may further include a clear laminated layer 170 extending over at least a portion of top surface 106, bottom surface 108, and first and second end surfaces 107, 109. In the exemplary embodiment shown in FIG. 3B, a laminated layer 170 encompasses the entire card, extending along top surface 106, including along a periphery of slot 145, and along the steps 110 in second, reduced thickness region 147. Laminated layer 170 may also overlay opposite side end surfaces of card 100. In embodiments where the milling of the reduced thickness portion of card 100 leaves a stepped profile such as shown in FIGS. 2B and 3B, laminated layer 170 may function to fill in steps 110 and create a smooth, outwardly convex profile along the reduced thickness portion that will not catch on edges of the pocket as card 100 is inserted into the pocket.

Alternative embodiments of card 100 (not shown) may include a multi-piece construction in which a top or bottom surface of the card is formed on a separate component of the card that is bonded to a card component that does not have the above-described structural features. For example, structural features such as slot 145 or another alternative tactile engagement feature, and a reduced thickness portion such as second region 147 may be included on an upper card component that is then bonded using adhesives to a simple, flat card component. In some embodiments, transaction card 100 may include a cavity/inlay construction in which a lower card component forms a cavity and an upper card component forms an inlay component configured to be seated within the cavity. The structural features for facilitating insertion and removal of the card from a pocket of a card-carrying case may be provided only in the upper card component, for example. It should be understood, however, that other configurations are possible. For example, transaction card 100 may include a "bucket-and-lid" construction in which a lower card component forms a container and an upper card component forms a lid that is configured to close the container and that rests on a rim of the lower card component.

Alternative methods of forming card 100 may include injection molding, compression molding, or another molding process. Card 100 may be constructed out of various materials that provide additional advantages and customizability. For example, card 100 may be constructed of soft touch plastics, hammered-texture materials, bead-blasted metals (e.g., aluminum), wooden materials (e.g., cherry, pine, ebony, oak, bamboo, etc.), sapphire crystal materials (both pure and doped with titanium), natural fiber composite materials, leather, ceramic materials, slate, etc. In some embodiments, separate card components may include additional material features, such as coverings (e.g., a silicone overmold), veneers (e.g., a wooden veneer), finishes (e.g. an oil-slick aluminum finish), or the like.

In some embodiments that include multiple card components, upper and lower card components may be made of different materials to achieve desired mechanical performance characteristics. For example, in some embodiments, one card component may be formed of a resin composite while another card component may be formed of a different material, such as a different resin composite, a metal, wood (e.g., one or more wood layers), woven fiber, or another type of material, which may have different mechanical properties and machinability characteristics than the other card component. That is, the materials used for a central, flat card component may have a different flexural modulus, Young's modulus, flexural strength, and machinability than a top or bottom card component bonded to the central flat card component and including the desired structural improvements for enhanced tactile engagement and pocket insertion. In this way, transaction card 100 may achieve improved mechanical performance (e.g., may be stiffer, stronger, more durable, etc.), while also allowing for ease of manufacture of the improved structural features. The different materials used may also have different densities, which can influence the overall weight of the card.

The elements in the following claims are to be interpreted broadly based on the language employed in the claims and not limited to examples described in the present specification or during the prosecution of the application, which examples are to be construed as non-exclusive. It is intended, therefore, that the specification and examples be considered as example only, with a true scope and spirit being indicated by the following claims and their full scope of equivalents.

What is claimed is:

1. A transaction card, comprising:
   a first, full thickness portion; and
   a second, reduced thickness portion;
   each of said first and second portions comprising a top surface and an opposing bottom surface spaced from the top surface by a thickness of the card;
   the first, full thickness portion comprising
     a feature deviating from a smooth, flat area along at least one of the top surface and the opposing bottom surface of the card and configured for tactile engagement to facilitate removal of the card from a pocket of a card carrying case; and
   the second, reduced thickness portion of the card comprising a stepped profile with multiple, successively thinner portions of the card at successively decreasing distances from an outer edge of the card configured to be inserted into the pocket before other portions of the card.

2. The transaction card of claim 1, wherein the feature deviating from the smooth, flat area comprises a slot.

3. The transaction card of claim 2, wherein the slot extends all the way through the card between the top surface and the bottom surface.

4. The transaction card of claim 2, wherein the slot extends only part of the way through the card from one of the top and bottom surfaces toward the other of the top and bottom surfaces.

5. The transaction card of claim 1, further including a transaction component affixed along one of the top or bottom surfaces.

6. The transaction card of claim 5, wherein the transaction component is affixed in a recess formed in one of the top or bottom surfaces of the first, full thickness portion.

7. The transaction card of claim 5, wherein the transaction component comprises at least one of a microchip and a magnetic strip.

8. A bank card, comprising:
   a first extent comprising a gripping feature configured for tactile engagement to facilitate removal of the card from a pocket of a card carrying case; and
   a second extent contiguous with the first extent and configured to be inserted into the pocket;
   each of said first and second extents comprising a top surface and an opposing bottom surface spaced from the top surface by a thickness of the card; and
   the second extent comprising a stepped profile with multiple, successively thinner portions of the card at successively decreasing distances from an outer edge of the card configured to be inserted into the pocket before other portions of the card.

9. The bank card of claim 8, wherein the gripping feature comprises a slot extending along a portion of the first extent.

10. The bank card of claim 9, wherein the slot extends only part of the way through the card from one of the top and bottom surfaces toward the other of the top and bottom surfaces.

11. The bank card of claim 9, wherein the slot extends all the way through the card between the top surface and the bottom surface.

12. The bank card of claim 8, further including a transaction component affixed along one of the top or bottom surfaces.

13. The bank card of claim 12, wherein the transaction component is affixed in a recess formed in one of the top or bottom surfaces of the first extent.

14. The bank card of claim 12, wherein the transaction component comprises at least one of a microchip and a magnetic strip.

15. The transaction card of claim 8, wherein a clear laminated layer extends over all of the top and bottom surfaces.

16. The bank card of claim 8, wherein the bank card is substantially rectangular in shape with first and second parallel sides being longer than third and fourth parallel sides, and with the first extent and the second extent extending substantially parallel to the first and second parallel sides.

17. A financial transaction card, comprising:
   a first extent comprising a gripping feature configured for tactile engagement to facilitate removal of the card from a pocket of a card carrying case; and
   a second extent contiguous with the first extent and configured to be inserted into the pocket;
   the financial transaction card being substantially rectangular in shape with first and second parallel sides being longer than third and fourth parallel sides, and with the first extent and the second extent each extending substantially parallel to the first and second parallel sides;

each of said first and second extents comprising a top surface and an opposing bottom surface spaced from the top surface by a thickness of the card; and the second extent comprising a stepped profile with multiple, successively thinner portions of the card at successively decreasing distances from an outer edge of the card configured to be inserted into the pocket before other portions of the card.

* * * * *